United States Patent Office 3,005,721
Patented Oct. 24, 1961

3,005,721
GLASS COMPOSITION
Nicholas F. Cerulli, Caldwell, N.J., assignor to Westinghouse Electric Corporation, East Pittsburgh, Pa., a corporation of Pennsylvania
No Drawing. Filed May 28, 1959, Ser. No. 816,404
11 Claims. (Cl. 106—47)

This invention relates to glass compositions and, more particularly, to a basic or "parent" glass formulation from which specific glass compositions that are especially adapted for use in ceramic-type electroluminescent devices can readily be obtained.

As is well known, in ceramic-type electroluminescent devices a mixture of finely divided electroluminescent phosphor and a suitable ceramic such as pulverized glass or so-called "frit" is deposited on a base member and fired to form a phosphor-impregnated glaze or enamel. Since the phosphor is completely embedded in the glass the latter must have the proper physical, chemical and optical characteristics. For example, the glass must not contain components or impurities that would react with or deleteriously alter the electroluminescent phosphor, it should transmit the radiations produced thereby and it should form a durable enamel of uniform thickness when fired. Above all, the glass must fire at a temperature sufficiently low to enable the phosphors to be embedded without being damaged or having their light-generating ability impaired and, since the glass also functions as the dielectric matrix for the phosphor, it must have the necessary electrical properties.

The aforesaid necessary electrical properties are as follows:

(a) *A high dielectric constant (K).*—To enable an electric field of high intensity to be applied across the embedded phosphor particles. The dielectric constant should be at least 7 and preferably 8 or higher.

(b) *A low dissipation factor (tan $\delta$).*—To minimize power losses within the dielectric. While a dissipation factor as low as possible would of course be desired, for satisfactory performance from an efficiency standpoint the dissipation factor should not exceed 0.003 (at room temperature) for frequencies from 100 to 10,000 c.p.s.

(c) *A high dielectric or breakdown strength.*—To prevent arc-rupture under high voltage operating conditions and premature failure of the electroluminescent device. The breakdown strength of the glass should be about at least 250 volts per mil if the glass is to be suited for general use in electroluminescent devices.

It has been found that a glass having the desired low firing temperature and the above-mentioned necessary electrical properties can be obtained by modifying an alkali-zinc borate glass to increase the dielectric constant thereof and then adding to this modified basic or "parent" glass formulation small quantities of selected materials as minor constituents to obtain the desired physical and working properties. Specifically, a zinc borate glass containing $K_2O$ and $Na_2O$ in the ratio by weight of approximately 2:1 is altered by substituting a "heavy" MO type oxide such as BaO or SrO, or mixtures thereof, for a part of the ZnO and controlling the ratio of MO to ZnO, and the ratio of ZnO plus MO to $B_2O_3$ to increase the dielectric constant to the desired value. The total alkali content of this modified zinc borate glass is then adjusted and small quantities of other materials such as $Al_2O_3$, $TiO_2$, $Sb_2O_3$ are added as minor constituents as required to obtain the desired physical and working properties, as for example, the proper coefficient of expansion, melting range, etc. The essence of the present invention accordingly resides in substituting predetermined amounts of BaO or SrO or mixtures thereof for ZnO in an alkali-zinc borate glass to provide a basic or "parent" glass formulation to which preselected minor constituents are added to obtain specific glass compositions and in this manner controlling the physical, chemical, optical and electrical properties of the specific glasses and adapting such glasses for use as the dielectric medium in ceramic-type electroluminescent devices.

The basic or "parent" glass formulation accordingly constitutes an alkaline earth-zinc borate glass containing among its base constituents $K_2O$ and $Na_2O$ in approximately the ratio of 2:1 by weight. The use of boric oxide rather than silica as the network-former of the parent glass decreases the firing temperature to a sufficiently low value to permit the electroluminescent phosphor particles to be embedded without thermal damage whereas the use of zinc oxide as the network modifier instead of lead as in the conventional lead-silica glasses inhibits the tendency of zinc sulfide type electroluminescent phosphors to dissociate or react with the glass matrix. While it was known that the use of $K_2O$ and $Na_2O$ in the ratio of approximately 2:1 by weight minimizes the power losses of lead-silicate type glasses and silica type glasses by decreasing the dissipation factor, it was not heretofore known or realized that a minimum dissipation factor could be obtained by employing the same optimum alkali content and ratio in a zinc borate type glass or a modification thereof. This discovery is of considerable interest since it indicates that the optimum alkali ratio is relatively independent of the parent glass in which it is employed.

It has also been discovered that, in contrast to other types of glasses, increasing the total alkali content while maintaining the optimum alkali ratio does not increase the dielectric constant of the modified zinc borate parent glass of the present invention, but that the dielectric constant is primarily dependent upon the concentration of alkaline-earth oxide or the MO component. In accordance with these findings, the $K_2O$ and $Na_2O$ content has not only been maintained within preselected limits and the aforesaid ratio, but the ratio of alkaline-earth oxide to ZnO and the ratio of ZnO plus alkaline-earth oxide to $B_2O_3$ have also been maintained within preselected limits. It is important to note also that only part of the zinc oxide is replaced by BaO or SrO in accordance with this invention and that a sufficient amount of ZnO is retained to minimize the solubility of zinc-sulfide type electroluminescent phosphors, thereby especially adapting the parent glass formulation for use in conjunction with such phosphors.

The constituents of the alkali-alkaline earth zinc borate parent glass of this invention and permissible ranges thereof are given in Table I below:

TABLE I

| Constituent: | Amount (percent by weight) |
|---|---|
| ZnO | 20–25 |
| BaO or SrO (or any mixtures thereof) | 25–45 |
| $B_2O_3$ | 25–45 |
| $K_2O$ | 6.7–13.4 |
| $Na_2O$ | 3.3–6.7 |

While the concentration of $K_2O$ and $Na_2O$ may vary within the ranges indicated it is essential that the ratio of $K_2O/Na_2O$ be maintained at approximately 2:1 in order for the glass to have the desired low dissipation factor.

Specific examples of several parent glass formulations made in accordance with the present invention are given in Table II below along with their electrical properties and the critical ratios of the constituents, the compositions being given in percent by weight of their oxide content calculated from their respective batches.

TABLE II

| Constituent | Examples | | | |
|---|---|---|---|---|
| | 1 | 2 | 3 | 4 |
| ZnO | 20.0 | 23.5 | 25.0 | 20.0 |
| BaO and/or SrO (MO) | 25.0 | 29.5 | 35.0 | 40.0 |
| $B_2O_3$ | 45.0 | 35.3 | 30.0 | 25.0 |
| $K_2O$ | 6.7 | 7.8 | 6.7 | 10.0 |
| $Na_2O$ | 3.3 | 3.9 | 3.3 | 5.0 |
| MO/ZnO (where MO=BaO and/or SrO) | 1.25:1 | 1.25:1 | 1.4:1 | 2:1 |
| $R/B_2O_3$ (where R=MO+ZnO) | 1:1 | 1.5:1 | 2:1 | 2.4:1 |
| $K_2O/Na_2O$ | 2:1 | 2:1 | 2:1 | 2:1 |
| Dissipation Factor (tan δ) | 0.0013 | 0.0011 | 0.0012 | 0.0011 |
| Dielectric Constant (K) | 7.57 | 8.12 | 8.31 | 9.06 |
| Dielectric Strength (volts/mil) | 520 | 540 | 540 | 500 |

As will be noted from the examples of the various parent glasses listed in Table II above, the dissipation factor is maintained at a very low value by maintaining the optimum $K_2O/Na_2O$ ratio of approximately 2:1 and that the dielectric constant (K) increases with increasing MO/ZnO and $R/B_2O_3$ ratios, MO being the total content in weight percent of BaO or SrO or mixture thereof, and R being the total content in weight percent of the alkaline earth and ZnO constituents. Thus, by properly controlling the aforesaid ratios, various parent glass formulations having the desired low firing temperature and the necessary electrical properties can readily be obtained. For a given glass, the dielectric constant and dissipation factors do not vary appreciably over the frequency range 100 c.p.s. to 100 kc.

As a specific example of the manner in which any one of the parent glass formulations listed in Table II may be further modified to obtain a specific glass composition which is suitable for use as the dielectric in a ceramic-type electroluminescent device, a parent glass having a formulation approxmately the same as that of Example 4 in Table II above and containing BaO as the alkaline-earth constituent has added thereto $Al_2O_3$, $TiO_2$ and $Sb_2O_3$ as minor constituents in the quantities listed below:

TABLE III

*Specific glass composition*

| Constituent: | Amount (weight percent) |
|---|---|
| ZnO | 18.1 |
| BaO | 37.4 |
| $B_2O_3$ | 22.7 |
| $K_2O$ | 9.2 |
| $Na_2O$ | 4.6 |
| $Al_2O_3$ | 3.6 |
| $TiO_2$ | 4.1 |
| $Sb_2O_3$ | 0.3 |

The $Al_2O_3$ is added to inhibit devitrification, the $TiO_2$ to maintain the high dielectric constant, and the $Sb_2O_3$ included as a reducing agent to prevent the electroluminescent phosphor from oxidizing during the firing of the glass. Frit prepared from this particular glass composition fires to a clear glass of high gloss at about 500° C., has a dielectric strength of 535 volts per mil, a dielectric constant of 9.15, and a dissipation factor of 0.0010. Other selected materials may also be present as minor constituents further to improve the chemical or physical properties, etc. of the glass.

To illustrate further the surprisingly good results obtained by controlling the electrical properties of the glass in accordance with this invention, the dissipation factor (tan δ), the dielectric constant (K), and the dielectric loss factor (K×tan δ) of the specific glass composition (alkali-barium zinc borate glass) given in Table III is contrasted in Table IV below with a good grade of commercial low loss glass (alkali-lead silicate capacitor glass Corning Code Designation #8871) and a plastic dielectric material such as a polyvinyl chloride acetate copolymer sometimes used as the dielectric material in glass-plastic type electroluminescent lamps:

TABLE IV

| Material | 100 c.p.s. | | | 100 kc. | | |
|---|---|---|---|---|---|---|
| | K | tan δ | Loss Factor (K×tan δ) | K | tan δ | Loss Factor (K×tan δ) |
| Alkali-Lead Silicate Glass | 8.45 | 0.0018 | 0.015 | 8.45 | 0.0007 | 0.006 |
| Alkali-Barium Zinc Borate Glass | 9.03 | 0.0012 | 0.110 | 9.03 | 0.0011 | 0.010 |
| Polyvinyl Chloride Acetate | 3.20 | 0.0100 | 0.932 | 3.00 | 0.0150 | 0.045 |

As shown in Table IV, the alkali-alkaline earth zinc borate parent glass suitably modified in accordance with the present invention has a higher dielectric constant (K) and lower dissipation factor (tan δ) than the alkali-lead silicate glass at low frequencies and has only a slightly higher tan δ value and loss factor at high frequencies. The polyvinyl chloride acetate plastic dielectric, on the other hand, is very poor in both respects at both high and low frequencies.

In the glass compositions given in Tables I to III above, the percent by weight of the various ingredients is calculated from the materials used to make the respective batches, that is the calculated metal content in each case actually refers to the content of the raw mix constituent and assumes that associated volatile compounds like water and carbon dioxide are eliminated. The various glasses may accordingly be fabricated by mixing carbonates, borates, etc. of the various components which decompose to the corresponding oxides during smelting. For example, the boric oxide is included in the raw mix as boric acid or borax.

The glass may be made in accordance with conventional glass-making practice. As a specific example, ingredients that will yield when decomposed by heating the calculated oxide compounds are mixed thoroughly by tumbling in a large jar and passing through a 16 mesh sieve. The mixture is then heated in a platinum crucible to about 1150° C. for one hour on the average, although firing times and temperatures will vary somewhat depending on the particular glass composition. The melt is then quenched by pouring it onto a stainless steel plate and the glass pulverized and passed through a No. 325 mesh sieve. The resultant glass powder or frit is then mixed with a predetermined amount of an electroluminescent phosphor such as the well-known copper-activated zinc sulfide. A layer of this glass-phosphor mixture is deposited on a base plate such as a clean porcelain-enameled iron plate and fired by heating in an air atmosphere to the firing temperature of the particular glass composition employed. Glasses prepared in accordance with the present invention form a clear glossy coating when fired that is inert with respect to the electroluminescent phosphors and forms a tenacious enamel coating on the base material. The glasses have good flow properties, are chemically stable in air, transmit the radiations produced by the phosphor and because of their low firing temperatures enables the phosphor particles to be embedded therein without thermally damaging or otherwise deleteriously affecting their light-generating properties.

While several specific examples of suitable parent glasses have been described in detail, it is to be particularly understood that other parent glasses as well as various specific glass compositions can readily be obtained by suitably adjusting the concentrations of the base constituents and combining therewith selected materials as minor constituents.

I claim:
1. A glass consisting essentially of the following constituents in approximately the indicated proportions;

| Constituent: | Percent by weight |
|---|---|
| ZnO | 20–25 |
| MO | 25–40 |
| $B_2O_3$ | 25–45 |
| $K_2O$ | 6.7–13.4 |
| $Na_2O$ | 3.3–6.7 | where MO is a substance selected from the group consisting of BaO, SrO and mixtures thereof, and wherein the ratio of $K_2O/Na_2O$ is approximately 2/1.

2. A glass as set forth in claim 1 wherein the ratio of MO/ZnO is between about 1.25/1 and about 2/1.

3. A glass as set forth in claim 1 wherein the ratio $R/B_2O_3$ is between about 1/1 to about 2.4/1, where R is equal to MO+ZnO.

4. A glass consisting essentially of the following constituents in approximately the indicated proportions;

| Constituent: | Percent by weight |
|---|---|
| ZnO | 20–25 |
| MO | 25–40 |
| $B_2O_3$ | 25–45 |
| $K_2O$ and $Na_2O$ | 10–20.1 | where MO is a substance selected from the group consisting of BaO, SrO and mixtures thereof.

5. A glass consisting essentially of up to a total of from 45 to 65% by weight of MO and ZnO in the ratio of between about 1.25/1 to 2/1, where MO is a substance selected from the group consisting of BaO, SrO and mixtures thereof; 25 to 45% by weight of $B_2O_3$; and 10 to 20.1% by weight of $K_2O$ and $Na_2O$ in the ratio of approximately 2/1.

6. A glass consisting essentially of the following constituents in approximately the indicated proportions;

| Constituent: | Percent by weight |
|---|---|
| ZnO | 20 |
| MO | 25 |
| $B_2O_3$ | 45 |
| $K_2O$ | 6.7 |
| $Na_2O$ | 3.3 | where MO is a substance selected from the group consisting of BaO, SrO and mixtures thereof.

7. A glass consisting essentially of the following constituents in approximately the indicated proportions;

| Constituent: | Percent by weight |
|---|---|
| ZnO | 23.5 |
| MO | 29.5 |
| $B_2O_3$ | 35.3 |
| $K_2O$ | 7.8 |
| $Na_2O$ | 3.9 | where MO is a substance selected from the group consisting of BaO, SrO and mixtures thereof.

8. A glass consisting essentially of the following constituents in approximately the indicated proportions;

| Constituent: | Percent by weight |
|---|---|
| ZnO | 25 |
| MO | 35 |
| $B_2O_3$ | 30 |
| $K_2O$ | 6.7 |
| $Na_2O$ | 3.3 | where MO is a substance selected from the group consisting of BaO, SrO and mixtures thereof.

9. A glass consisting essentially of the following constituents in approximately the indicated proportions;

| Constituent: | Percent by weight |
|---|---|
| ZnO | 20 |
| MO | 40 |
| $B_2O_3$ | 25 |
| $K_2O$ | 10 |
| $Na_2O$ | 5 | where MO is a substance selected from the group consisting of BaO, SrO and mixtures thereof.

10. A glass consisting essentially of the following constituents in approximately the indicated proportions;

| Constituent: | Percent by weight |
|---|---|
| ZnO | 18.1 |
| BaO | 37.4 |
| $B_2O_3$ | 22.7 |
| $K_2O$ | 9.2 |
| $Na_2O$ | 4.6 |
| $Al_2O_3$ | 3.6 |
| $TiO_2$ | 4.1 |
| $Sb_2O_3$ | 0.3 |

11. A glass consisting essentially of the following constituents in approximately the indicated proportions;

| Constituent: | Percent by weight |
|---|---|
| ZnO | 20–25 |
| MO | 25–40 |
| $B_2O_3$ | 25–45 |
| $K_2O$ | 6.7–13.4 |
| $Na_2O$ | 3.3–6.7 | where MO is a substance selected from the group consisting of BaO, SrO and mixtures thereof, and wherein the ratio of $K_2O/Na_2O$ is approximately 2/1, the ratio of MO/ZnO is between about 1.25/1 and about 2/1, and the ratio $R/B_2O_3$ is between about 1/1 to about 2.4/1, where R is equal to MO+ZnO.

References Cited in the file of this patent

UNITED STATES PATENTS 2,584,974    Armistead _____ Feb. 12, 1952

FOREIGN PATENTS 723,087    Great Britain _____ Feb. 2, 1955

UNITED STATES PATENT OFFICE
CERTIFICATE OF CORRECTION

Patent No. 3,005,721                        October 24, 1961

Nicholas F. Cerulli

It is hereby certified that error appears in the above numbered patent requiring correction and that the said Letters Patent should read as corrected below.

Column 4, TABLE IV, fourth column, line 3 thereof, for "0.932" read -- 0.032 --.

Signed and sealed this 15th day of January 1963.

(SEAL)
Attest:

ERNEST W. SWIDER
Attesting Officer

DAVID L. LADD
Commissioner of Patents